United States Patent Office 3,321,330
Patented May 23, 1967

3,321,330
TEXTILE MATERIALS AND METHOD OF
MAKING THE SAME
William K. Mohney, Meadville, Pa., assignor to FMC Corporation, Philadelphia, Pa., a corporation of Delaware
No Drawing. Filed Mar. 3, 1964, Ser. No. 349,163
9 Claims. (Cl. 117—136)

This invention relates to improved flame retardant cellulose organic acid ester compositions, and especially cellulose acetate.

In recent years, chlorinated alkyl phosphates, such as tris(chloroethyl) phosphate, tris(bromochloropropyl) phosphate and tris(dibromochloropropyl) phosphate, have come into use as flame retardant materials for cellulose acetate and other organic acid esters of cellulose materials. Although these phosphates are among the most effective flame retardants known, they must be used in relatively large amounts to achieve satisfactory results. For example, when applied to the surface of cellulose acetate materials which are intended to be laundered, often well over 50%, by weight, of a chlorinated alkyl phosphate must be employed for satisfactory results. Similarly, when used as an additive, it is common to incorporate from 10% to 15% by weight of such phosphate into a cellulose acetate solution, based on the weight of the cellulose acetate content of the solution, to impart effective flame retardant characteristics to the finished product.

It is an object of this invention to provide cellulose organic acid ester compositions, filaments, fibers and fabrics which have good flame retardant characteristics.

Another object of the invention is to render cellulose acetate yarns and articles made therefrom flame-retardant without appreciably altering the physical characteristics and properties of the yarn such as strength, stretch, luster and hand.

Still another object is to render yarn and other articles formed of conventional cellulose organic acid ester compositions fire-retardant and to provide fire-retardant cellulose organic acid ester compositions by employing phosphonates of the group (1) bis-(bromohalopropyl) bromohalopropylphosphonates in which the bromohalopropyl radicals are each selected from the group consisting of dibromopropyl and bromochloropropyl, and (2) polyphosphonates formed by intermolecular reaction of the corresponding phosphites.

Still further objects and advantages of the present invention will appear from the following detailed description and the claims.

In accordance with the present invention, cellulose organic ester compositions and filaments and fibers made therefrom may be made flame-retardant by incorporating therein phosphonates selected from the group consisting of (1) bis-(bromohalopropyl) bromohalopropylphosphonates in which the bromohalopropyl radicals are each selected from the group consisting of dibromopropyl and bromochloropropyl, and (2) polyphosphonates formed by intermolecular reaction of the corresponding phosphites. The amount of selected phosphonates employed will, in general, vary with the manner of application and the particular results which are desired.

As more fully described in U.S. patent application of B. S. Taylor and M. R. Lutz, Serial No. 316,423, filed Oct. 15, 1963, entitled, "Novel Flame Retardants," one method of preparing the phosphonates is by reacting a phosphorous trihalide with epihalohydrin to form a tris(bromohalopropyl) phosphite. Obviously, one of the reactants must contain bromine and the remaining halogen is chlorine.

The phosphite intermediate is isomerized by heat, or an appropriate catalyst, to form the corresponding bis-(bromohalopropyl) bromohalopropylphosphonate by intramolecular rearrangement in accordance with the equation:

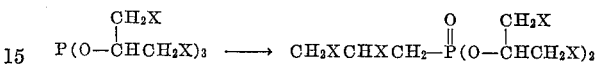

If one of the bromohalopropyl radicals in the phosphite is normal, as indicated above, and the n-propyl group is involved in the rearrangement, then the phosphonate will have the structure:

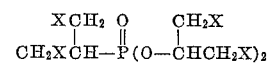

When the n-propyl group is not involved in the rearrangement, then the phosphonate has the structure:

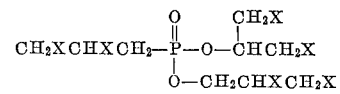

During the isomerization of the phosphite, a variable amount of isomerization takes place by intermolecular reaction of the phosphite to form primarily diphosphonate and a small amount of trihalopropane in accordance with the equations:

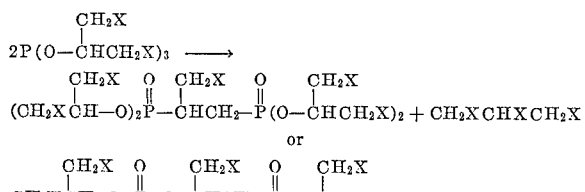

Although the exact structure of the diphosphonate is not certain, it is likely that either or both of the structures shown above are formed. It is also quite possible that a small amount of the diphosphonate reacts with further phosphite to form triphosphonate, etc. It is intended that the term "polyphosphonate" includes diphosphonate, triphosphonate, and higher intermolecular reaction products.

The phosphonates are effective as fire retardants for cellulose organic acid ester compositions, and particularly cellulose acetate, when incorporated therein in an amount ranging from 0.5% to 8.0%, based upon the weight of the cellulose ester. In general, employing from 2% to 4% of the selected phosphonates provides the cellulose organic acid ester compositions with satisfactory flame retardant properties. When making filaments and fibers the phosphonates noted above may be dissolved in a suitable solvent and then injected or otherwise incorporated homogeneously into a cellulose ester spinning solution immediately prior to shaping of the same by the well-known dry spinning process. Since the added phosphonates are well dispersed throughout the resulting filaments, removal of the same is made difficult, even under scouring and dry cleaning conditions. The yarns and fabrics produced from such filaments exhibit excellent fire-retardant properties.

The phosphonates noted above are also effective when applied to the surface, and more particularly impregnated into filaments, fibers or fabrics formed of cellulose acetate and other organic acid esters of cellulose materials. In general, there may be employed from about 2% to 50%, by weight, of the selected phosphonates, based upon the weight of the material which is being treated. For applications where the fire-retardant material will not be laundered or dry cleaned and need not be relatively permanent to these treatments, as little as from 2% to 5%, by weight, of the selected phosphonates will impart a satisfactory degree of flame retardency to cellulose acetate and other organic acid esters of cellulose materials. For applications where the fire-retardant materials must be relatively permanent to laundering and dry cleaning, it is preferred to employ from about 10 to 50%, by weight, of the selected phosphonate.

The selected phosphonates may be applied to the cellulose acetate and other organic acid ester cellulose materials in several different ways, as for example from a solution in a solvent or solvent mixture or from a dispersion in water or other liquid. With either procedure the solvent or liquids employed should not dissolve the cellulose acetate or other organic acid ester of cellulose materials which are being treated. In general, the application of the selected phosphonates in the presence of a swelling agent for the organic acid ester of cellulose material which is being treated provides for a considerable improvement in the relative permanence of the treated materials to laundering and dry cleaning. In many cases the solvent or solvent mixture employed will have a sufficient effect upon the material which is being treated so that no additional swelling agent may be required.

Generally, the above-noted phosphonates, when incorporated into the organic acid ester cellulose composition or when applied to filaments and fabrics formed from organic acid ester compositions, do not normally alter the hand, appearance or other physical properties of the resulting product.

In addition to the selected phosphonates noted above, other haloalkyl phosphonates, such as bis-(dichloropropyl) dichloropropylphosphonate, bis-(bromoethyl) bromoethylphosphonate, and bis-(chloroethyl) chloroethylphosphonate are also effective as flame retardants for cellulose acetate.

The terms "fire-retardant" and "flame-retardant" as used in the description and claims are intended to designate a structure which is resistant to the propagation of flame across its surface after the igniting flame has been removed (self-extinguishing) and which is also resistant to smouldering or the formation of a non-flaming combustion which manifests itself as a red glow.

The invention may be further illustrated by the following examples:

EXAMPLE I

A solution of flame retardant material was first prepared by dissolving bis-(bromochloropropyl) bromochloropropylphosphonate in acetone. Cellulose acetate flake was then charged into this solution to produce a concentrate or "paste" containing 16% cellulose acetate and 15% of the bis-(bromochloropropyl bromochloropropylphosphonate.

Using conventional dry spinning equipment, having a blending mechanism as employed in the production of spun-dyed pigmented yarns, the prepared concentrate of flame retardant material was injected into a bright cellulose acetate spininng solution containing 25% cellulose acetate as it was extruded through a spinneret. The rate at which the concentrate was injected into the cellulose acetate spinning solution was varied to provide yarns having 2%, 4% and 6%, by weight of the acetate, of the bis-(bromochloropropyl) bromochloropropylphosphonate. The presence of the flame retardant in the spinning solution slowed the drying rate of the yarns and thus a more conservative spinning speed was employed to compensate for this factor.

The flame retardant properties of each of the above described yarns were determined by comparing the same with cellulose acetate yarns containing 2%, 4% and 6% tri-(2,3 dibromopropyl) phosphate, by weight of the acetate. More particularly, hanging skeins of each of these yarns was ignited with a Bunsen burner flame and then observed to determine their relative tendency and rate to extinguish when the flame was removed. In each instance the yarns containing the bis-(bromochloropropyl) bromochloropropylphosphonate exhibited flame retardant properties which were superior to the yarns having a corresponding percentage of tri-(2,3 dibromopropyl) phosphate. Additionally, the yarns containing the bis-(bromochloropropyl) bromochloropropylphosphonate had no detrimental affect upon their hand or luster.

EXAMPLE II

A cellulose acetate solution containing 25% cellulose acetate was shaped into a yarn using conventional dry spinning procedures. This yarn was then passed through a bath containing 50% of bis-(bromochloropropyl) bromochloropropylphosphate and 50% of ethyl ether, dried and then taken up on a tube. Analysis of the treated yarn indicated it contained about 13% of the bis-(bromochloropropyl) bromochloropropylphosphonate, by weight, based upon the weight of the treated material. Testing of this yarn in the same manner as described in Example I revealed that it had excellent flame retardant properties.

It is to be understood that changes and variations may be made without departing from the spirit and scope of the invention as defined in the appended claims.

I claim:

1. A flame retardant filament formed from a composition consisting of a cellulose organic acid ester and a flame-retardant component consisting essentially of from 0.5% to 8.0% by weight of the ester of a phosphonate selected from the group consisting of (1) bis(bromohalopropyl) bromohalopropylphosphonates in which the bromohalopropyl radicals are each selected from the group consisting of dibromopropyl and bromochloropropyl, and (2) polyphosphonates formed by intermolecular reaction of the corresponding phosphites.

2. A flame-retardant textile material as defined in claim 1 wherein the cellulose organic ester is cellulose acetate.

3. A flame-retardant textile material as defined in claim 2 wherein from 0.5% to 6.0% of the flame-retardant component is employed and wherein said flame-retardant component is bis-(bromochloropropyl) bromochloropropylphosphonate.

4. A flame-retardant textile material formed from an organic cellulose ester composition impregnated with a flame-retardant consisting essentially of from 2.0% to 50% by weight of the ester selected from the group consisting of (1) bis-(bromohalopropyl) bromohalopropylphosphonates in which the bromohalopropyl radicals are each selected from the group consisting of dibromopropyl and bromochloropropyl, and (2) polyphosphonates formed by intermolecular reaction of the corresponding phosphites.

5. A textile material as defined in claim 4 wherein the organic cellulose ester is cellulose acetate.

6. A textile as defined in claim 5 wherein the flame retardant composition is bis-(bromochloropropyl) bromochloropropylphosphonate.

7. Process for rendering textile materials formed from organic esters of cellulose flame retardant, said process comprising impregnating said materials with bis-(bromochloropropyl) bromochloropropylphosphonate dissolved in a solvent which is a non-solvent for the material being treated, the amount of bis-(bromochloropropyl) bromochloropropylphosphonate added to said textile materials being about 2 to 50% by weight based on the weight of the textile material being treated and thereafter drying the textile materials.

8. A process as defined in claim 7 wherein the textile material is formed from cellulose acetate.

9. A process as defined in claim 8 wherein said bis-(bromochloropropyl) bromochloropropylphosphonate is dissolved in ethyl ether.

References Cited by the Examiner

UNITED STATES PATENTS

| | | | |
|---|---|---|---|
| 2,574,515 | 11/1951 | Walter et al. | 117—136 X |
| 2,660,543 | 11/1953 | Walter et al. | 117—136 |
| 2,803,562 | 8/1957 | Erbel et al. | 117—136 |
| 2,876,117 | 3/1959 | Jackson et al. | 117—137 X |
| 2,876,118 | 3/1959 | Jackson | 117—137 |
| 3,046,236 | 7/1962 | Jahn | 252—8.1 X |

WILLIAM D. MARTIN, *Primary Examiner.*

T. G. DAVIS, *Assistant Examiner.*